United States Patent [19]
Cucchi

[11] Patent Number: 5,910,200
[45] Date of Patent: Jun. 8, 1999

[54] CENTERING DEVICE FOR BARS IN AUTOMATIC MAGAZINES AND MAGAZINE FOR USE THEREWITH

[75] Inventor: Pietro Cucchi, Bussero, Italy

[73] Assignee: Pietro Cucchi S.p.A., Italy

[21] Appl. No.: 08/890,747

[22] Filed: Jul. 11, 1997

[30]     Foreign Application Priority Data

Jul. 24, 1996 [IT] Italy .................................. MI96A1550

[51] Int. Cl.⁶ .................................................. B23B 13/10
[52] U.S. Cl. .............................. 82/126; 82/127; 82/163; 82/164
[58] Field of Search ............................. 82/126, 127, 125, 82/163, 164, 170, 903; 414/14, 17, 18

[56]                 References Cited

U.S. PATENT DOCUMENTS

| 3,927,585 | 12/1975 | Austin | ........................................ 82/163 |
| 4,058,036 | 11/1977 | Austin | ........................................ 82/163 |
| 4,149,437 | 4/1979 | Winberg et al. | ........................... 82/163 |

FOREIGN PATENT DOCUMENTS

| 2806780 | 8/1979 | Germany | .................................. 82/163 |
| 0808207 | 3/1981 | U.S.S.R. | .................................. 82/163 |
| WO091003344 | 3/1991 | WIPO | ..................................... 82/127 |

*Primary Examiner*—Frances Han
*Assistant Examiner*—Henry W. H. Tsai
*Attorney, Agent, or Firm*—Shlesinger, Fitzsimmons & Shlesinger

[57]                ABSTRACT

A support and centering device for a fed bar, in a bar magazine for lathes, comprises a plurality of rods (11) supported at the ends by a first (12) and a second (13) support elements facing each other. The rods (11) are such arranged as to identify a passageway (19) for the bar internally of the plurality of rods and the support elements (12, 13) are mutually rotatable about the passageway axis (36) to tilt the rods (11) relative to this axis, thereby varying the transverse size of the passageway. The supports are spring urged against each other to provide a spring support to the bar and enable passage of a pusher of the bar magazine.

12 Claims, 2 Drawing Sheets

CENTERING DEVICE FOR BARS IN AUTOMATIC MAGAZINES AND MAGAZINE FOR USE THEREWITH

BACKGROUND OF THE INVENTION

The present invention relates to an adjustable device for centering high-speed rotating bars in automatic magazines interlocked with lathes, and to a magazine for use with such a device.

In the known art automatic magazines sequentially loading and feeding bars to lathe mandrels are well known. These magazines can be of the type feeding single-mandrel or multi-mandrel lathes.

One of the major problems in these magazines is how to enable free rotation of the bars that may be fed also at high and very high speed, without vibrations along the bar taking place. Solution of this problem is made still more difficult, due to the fact that the diameter of the bars to be fed can vary within a very wide range, whereas the pusher moving the bar towards the lathe has a fixed diameter greater than that of the fed bar.

In the known art, magazines have been proposed which have guides extended along the bar path, which guides for instance consist of a plurality of circumferential aligned segments to form a cylindrical duct in which the bar and the related pusher run. The cylindrical duct has the same diameter as the pusher to enable passage thereof. The bar fed to the guide therefore has a side clearance which may be even very high.

Although the bar is supported at the leading end by the lathe mandrel and at the trailing end by the pusher clamp (in turn guided by the cylindrical duct), when distance between the leading and trailing support point is great, the bar has a tendency to bend and its quick rotation causes vibrations affecting the lathe, thereby impairing operation of the lathe itself.

It is a general object of the present invention to obviate the above mentioned drawbacks by providing a centering device that can be easily adjusted depending on the diameter of the used bar, so as to support it in an efficient manner at points intermediate its ends and also damping possible vibrations, while at the same time enabling passage of a pusher of bigger diameter. It is a further object of the invention to provide a magazine for use with such a device.

SUMMARY OF THE INVENTION

In view of the above object, in accordance with the invention, a support and centering device has been conceived for a bar fed to a bar magazine for lathes, comprising a plurality of rods supported at the ends by a first and a second support elements facing each other, the rods being disposed to identify a passageway for the bar internally of the plurality of rods, the support elements being mutually rotatable about the passageway axis so as to cause tilting of the rods relative to this axis and thus vary the transverse size of such a passageway. Also proposed is a magazine for use with such a device.

BRIEF DESCRIPTION OF THE DRAWINGS

For better explaining the innovatory principles of the present invention and the advantages it offers over the known art, a possible embodiment applying these principles will be given hereinafter by way of non-limiting example with the aid of the accompanying drawings. In the drawings.

DETAILED DESCRIPTION OF THE INVENTION

Figure 1:
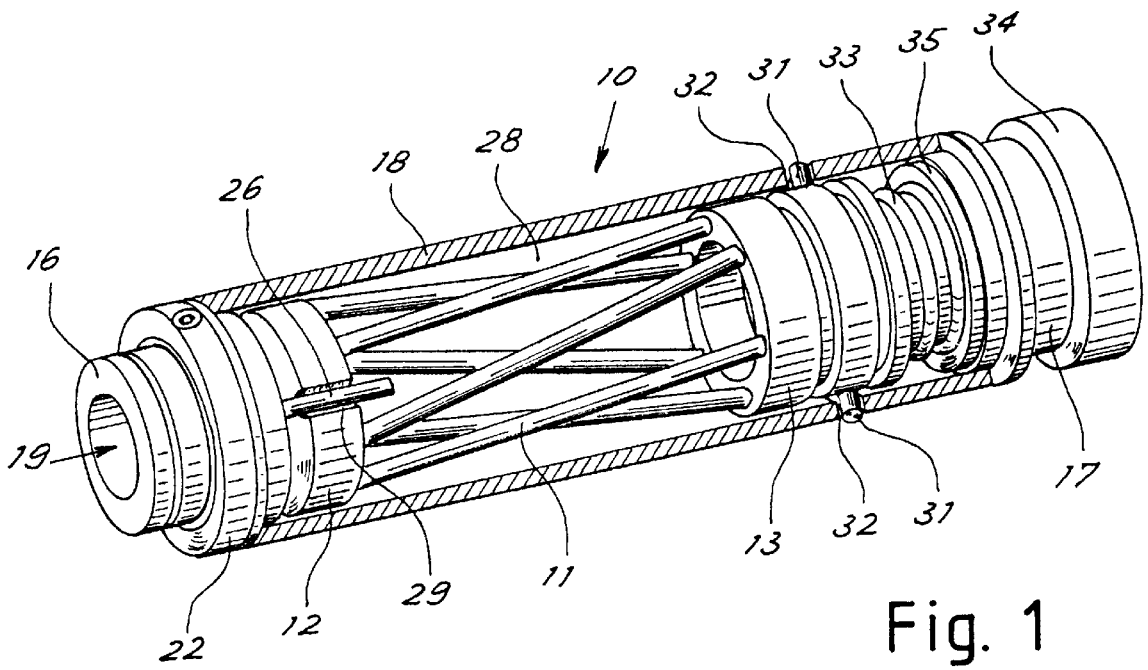
FIG. 1 is a diagrammatic perspective view, partly in section, of a centering device in accordance with the invention.

With reference to the drawings, a centering device generally denoted by 10 and made in accordance with the invention is shown in FIG. 1. Device 10 comprises rods 11 the ends of which are connected by fitting, in equidistant relationship, with two coaxially disposed respective rings 12, 13 so as to identify a passage channel for one bar. The ends of the rods are such connected that they are tiltable in the ring plane and the rings can rotate relative to each other about a common axis. Upon rotation of the rings, the rods tilt relative to the generatrices of an imaginary cylinder the bases of which are identified by the rings themselves, as clearly viewed from FIG. 1. In this way, in a plane perpendicular to the channel axis between the rings, the tilted rods identify, by their envelope, a circular passage the diameter of which depends on the mutual ring rotation.

Figure 2:
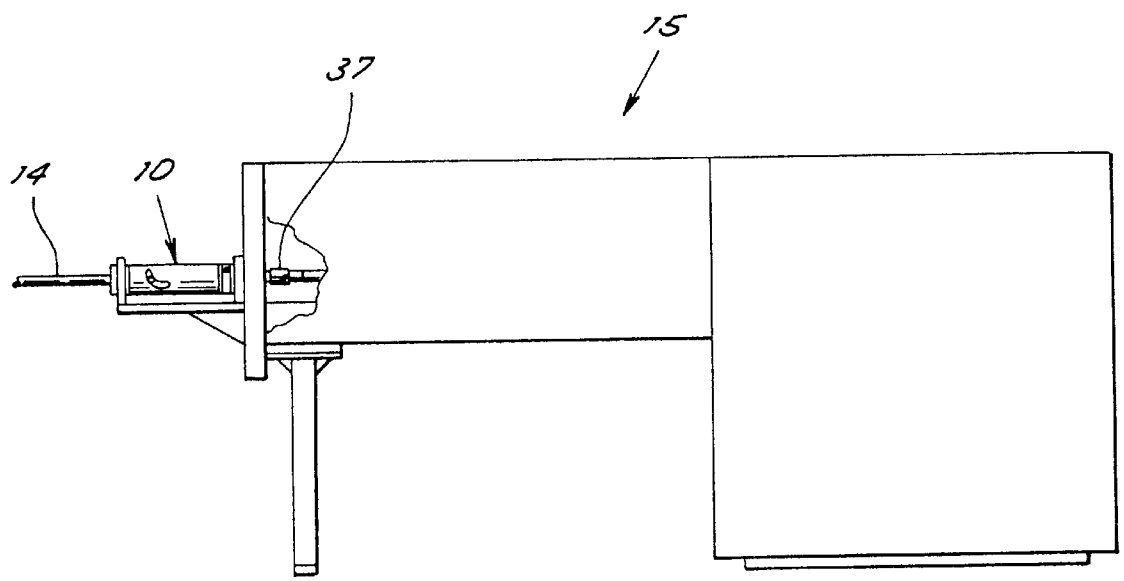
FIG. 2 is a diagrammatic elevation side view, partly in section, of a bar magazine employing the centering device shown in FIG. 1.

As shown in FIG. 2, the device 10 is supported so as to be freely rotatable in axial alignment along the feeding path or passage of a bar 14 in a magazine 15. The bar is moved along the path by a pusher 37. The magazine, of the single or multi-mandrel type, is for the rest substantially of known art and will not be here further described or shown. Should a multi-mandrel lathe be concerned, each channel for feeding one bar will have a device in accordance with the invention.

The device position along the feeding path will be selected so as to be able to support the bar at such a position intermediate the lathe and pusher clamp that the bar bending will be minimized and also minimized will be, as a result, the vibrations produced when the bar between the supports has such a length that unacceptable vibrations would be produced if it were held only at its ends.

Shown in the figures is a possible embodiment of the device which enables the latter to achieve the required strength with ease and to be safely fixed to the magazine structure, while at the same time the device itself is capable of rotating freely, adjusting the passage channel depending on the diameter of the fed bar and providing an elastic reaction helping in damping vibrations and enabling passage of a pusher of a diameter bigger than that of the fed bar.

Figure 3:
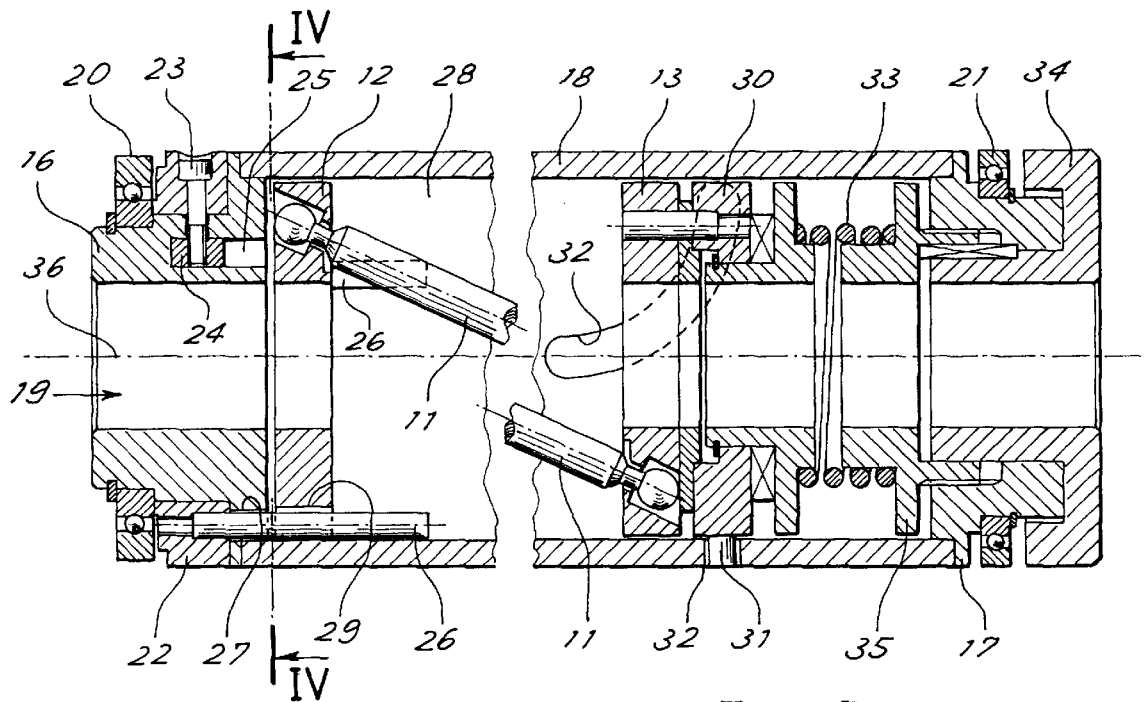
FIG. 3 is a fragmentary cross-sectional view of the centering device in FIG. 1.
Figure 4:
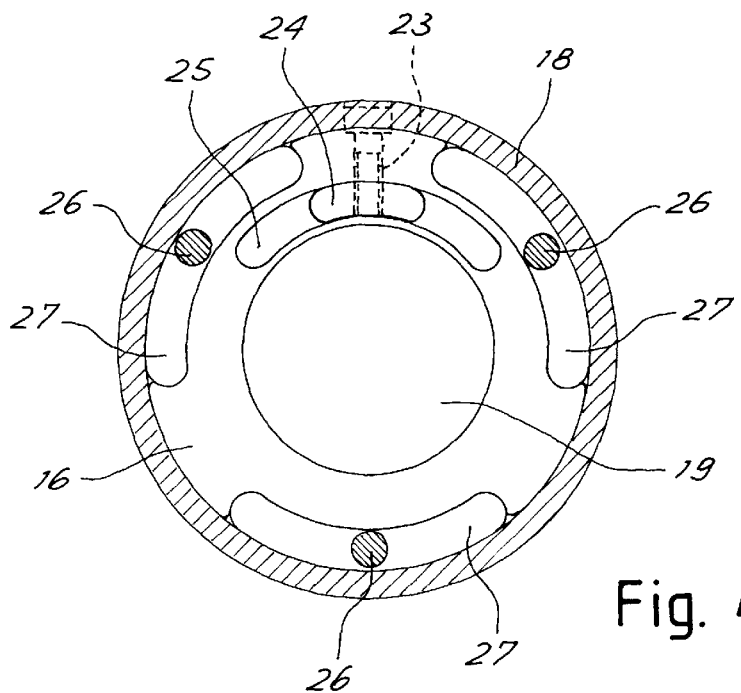
FIG. 4 is a sectional view taken along line IV—IV in FIG. 3.

As clearly seen in FIG. 3, the device is comprised of two end sleeves 16, 17 integrally interconnected by a cylindrical wall or tube 18 to form a cylinder confining a cylindrical cavity 28 in which rings 12, 13 connected with rods 11 are housed. Axially of the device there is an open passageway 19 for a bar to be supported, the bar inlet taking place through sleeve 16 and the bar outlet through sleeve 17. Passageway 19 is of bigger diameter than both that of the biggest bar to be fed and that of the magazine pusher.

Sleeves 16, 17 are fastened to supports in the magazine by interposition of bearings 20, 21, so that the whole device can rotate freely about its own centre axis 36.

Sleeve 16 peripherally supports an adjustment ring nut 22 in a rotatable manner, rotation of which may be locked by means of a screw 23 engaging in a slider 24 within an appropriate hollow 25 in the sleeve. Fixed in the ring nut 22 are pins 26, directed parallelly to the device axis so as to pass through circumferential slots 27 in the sleeve 16 and enter the cylindrical cavity 28. Pins 26 act as guides along which the ring 12 is axially slidable by means of peripheral housings 29 of its own.

The opposite ring 13 is connected to a guide ring nut 30 having radially projecting pins 31 intended for sliding in grooves 32 provided in the cylindrical wall 18 Grooves 32 are such shaped that upon an axial sliding of the guide ring nut 30, a rotation of same relative to the cylinder occurs. In particular, upon sliding of the ring nut to such an extent that the two rings 12, 13 are moved apart from each other, a rotation takes place that reduces tilting of the rods and therefore increases the diameter of the passage section identified by said rods.

Provided between the guide ring nut 30 and sleeve 17 is an axial thrust spring 33 urging ring 13 towards ring 12, thereby supplying an elastic means for closure of the passage defined by the tilted rods. Advantageously, provision may be made for a means for adjusting the spring compression or preloading and, as a result, the force to be imparted to the rods to move them away from each other, thereby enlarging passage between them again.

The adjusting means may be for example formed of an operating ring nut 34 enabling a ring 35 screwed down within the sleeve 17 to be manually rotated and constituting a support for the spring.

In use, the device will be adjusted by means of the ring nut 22 so as to enable tilting of the rods until a passage is reached between said rods which is adapted for the diameter of the bars to be fed. If necessary, the elastic force by which the rods hold a bar passing through the device can be adjusted by acting on the ring nut 34. While a bar is being fed, the magazine pusher moves the bar on, introducing it first into the device 10 and subsequently into the lathe mandrel. Device 10 laterally guides the bar by supporting it at an intermediate position. The resting points between the bar and the centering device 10 are given by intersection of cylinders with mutually tilted axes. Therefore the bar can run very smoothly within the cylinder. In addition, it has been found that this offers an excellent centering effect and dampens vibrations on the bar.

During the different lathe machining operations, the pusher goes on moving the bar forward through the device 10. When the pusher head reaches the device 10, it penetrates into the passageway 19 and exerts pressures on the tilted rods 11 at the smallest diameter point of the passage formed by them. The exerted thrust is of such an extent as to overcome the reaction force of spring 33 and, as a result, the rods will tend to straighten themselves causing the ring 13 to rotate and move away from ring 12. Thus the pusher can continue its stroke towards the lathe and is, in turn, perfectly supported by device 10, in spite of its diameter being different from that of the bar. At this point it is apparent that the intended purposes have been achieved, by providing a centering device enabling a perfect elastic support of a bar and passage and support of a pusher of different diameter.

Obviously, the above description of an embodiment applying the innovative principles of the present invention is given for purposes of illustration only and is not to be interpreted as a limitation of the inventive scope herein claimed. For example, the outer structure of the device and the proportions between the different parts may vary depending on practical requirements, and the adjustment of the elastic force keeping passage between the rods closed may be different too, or said elastic force may be even dispensed with. In addition, instead of an axial elastic force, an elastic force for rotation of the rings may be directly applied, the spring thrust means being modified as can be easily envisaged by a person skilled in the art. Rods 11 may be made of steel or plastic material (Teflon, for example) also based on the material of the bars to be fed, so as to have good features in terms of smooth running and resistance to wear.

What is claimed is:

1. A support and centering device for a cylindrical bar fed to a bar magazine for lathes, comprising a plurality of rods extending between and supported at opposite ends thereof by first and second support elements disposed in spaced, confronting relation to each other, the rods being disposed to form a passageway for said bar internally of the plurality of rods, the support elements being mutually rotatable about the passageway axis, adjusting means operable to adjust the mutual position of said elements so as to cause tilting of the rods relative to said axis and thus to set the minimum diameter of such a passageway, and resilient means operative to cause said rods to be tilted resiliently in a direction to enlarge the diameter of said passageway when an item larger than said minimum diameter is fed through said passageway.

2. A device as claimed in claim 1, characterized in that the support elements consist of a pair of rings the axes of which are coincident with the passageway axis.

3. A device as claimed in claim 1, characterized in that the support elements are spring-pushed one towards the other.

4. A device as claimed in claim 1, characterized in that the support elements and rods are held in a cylindrical envelope having an axis coincident with the passageway axis and formed of a first and a second end sleeves, provided with holes to form an extension of the passageway, and a cylindrical wall connecting the sleeves.

5. A device as claimed in claim 4, characterized in that said adjusting means comprises means connecting the first support element to the first sleeve and operable for effecting adjustment of the angular position of the first support element relative to said first sleeve.

6. A device as claimed in claim 5, characterized in that the adjusting means further comprises a ring nut rotating about the first sleeve and supporting pins directed parallel to the passageway axis and fitting in the first support element and making said first element rotatably integral with the ring nut, and enabling said first element to axially slide relative to the ring nut.

7. A device as claimed in claim 4, characterized in that the second support element is connected to the second sleeve by said resilient means which comprises spring thrust means urging said support element towards the first support element.

8. A device as claimed in claim 7, including means for adjusting preloading of the spring thrust means.

9. A device as claimed in claim 8, characterized in that the preloading adjusting means comprises a ring nut axially rotatable in the second sleeve to move a support of the thrust means made in the form of a spring in an axial direction by screwing.

10. A device as claimed in claim 5, characterized in that the second support element is axially slidable in said cylindrical wall and has projecting therefrom radial pins sliding in grooves in said cylindrical wall and operative to produce a rotation of the second support element upon its axial sliding movement.

11. A device as claimed in claim 4, characterized in that the first and second sleeves are peripherally provided with bearings for rotatably supporting the sleeves on the magazine while enabling the sleeves to freely rotate axially relative to the magazine.

12. A bar magazine for lathes comprising at least one sliding passage for a bar and a pusher which axially pushes the bar through the passage, characterized in that along said passage a support and centering device for the bar is provided, which device comprises a plurality of rods supported at opposite ends thereof by first and second spaced support elements facing each other, the rods being disposed so as to form a bar-guide passageway internally of the plurality of rods, which passageway is disposed coaxially with said sliding passage, the support elements being mutually rotatable about the passageway axis one relative to the other to tilt the rods relative to said axis, thereby varying the diameter of said guide passageway, and the support elements being spring urged towards each other to enable rotation of the rods resiliently in an enlarging direction of the guide passageway, upon introduction of said pusher into the guide passageway.

* * * * *